(12) United States Patent
Chen et al.

(10) Patent No.: US 10,048,432 B2
(45) Date of Patent: Aug. 14, 2018

(54) BACKLIGHT MODULE AND LIQUID CRYSTAL DISPLAY

(71) Applicant: Wuhan China Star Optoelectronics Technology Co., Ltd., Wuhan, Hubei (CN)

(72) Inventors: Qian Chen, Guangdong (CN); Shih-Hsiang Chen, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 99 days.

(21) Appl. No.: 15/152,531

(22) Filed: May 11, 2016

(65) Prior Publication Data

US 2017/0285252 A1    Oct. 5, 2017

(30) Foreign Application Priority Data

Mar. 30, 2016   (CN) .......................... 2016 1 0191043

(51) Int. Cl.
*F21V 8/00* (2006.01)
(52) U.S. Cl.
CPC .......... *G02B 6/0083* (2013.01); *G02B 6/003* (2013.01); *G02B 6/0055* (2013.01); *G02B 6/0068* (2013.01)

(58) Field of Classification Search
USPC .......................................................... 362/606
See application file for complete search history.

(56) References Cited

U.S. PATENT DOCUMENTS

| 2012/0212975 A1* | 8/2012 | Masuda | G02B 6/001 362/606 |
| 2015/0042899 A1* | 2/2015 | Tomomasa | G02F 1/133308 348/790 |

\* cited by examiner

*Primary Examiner* — Michael G Lee
*Assistant Examiner* — David Tardif
(74) *Attorney, Agent, or Firm* — Andrew C. Cheng

(57) ABSTRACT

A backlight module includes a light guide plate that includes a light incident surface including a first light incident section and a second light incident section, a light emission surface, and a first reflection surface defining a first acute angle with respect to the first reflection surface; a light bar, which includes first and second light sources respectively corresponding to the first and second light incident section such that light from the first and second light sources is allowed to enter the light guide plate to be selectively reflected by the first reflection surface and emit outward from the light emission surface; and a control circuit, which is electrically connected to the first light source and the second light source for controlling the first light source and the second light source. Also provided is a liquid crystal display that includes the backlight module and may achieve sectionized displaying.

9 Claims, 4 Drawing Sheets

BACKLIGHT MODULE AND LIQUID CRYSTAL DISPLAY

BACKGROUND OF THE INVENTION

1. Field of the Invention

The present invention relates to the field of backlighting display technology, and more particularly to a backlight module and a liquid crystal display that uses the backlight module.

2. The Related Arts

Liquid crystal displays have various advantages, such as small size, low power consumption, and being free of radiation, and has made great progress in respect of screen size and displaying quality, making them the main stream product in the market in all aspects including mobile phones, computer monitors, and televisions.

Most of the liquid crystal displays available in the market are backlighting liquid crystal displays, which comprise a liquid crystal display panel and a backlight module. Since the liquid crystal display panel is not luminous by itself, lighting must be provided from the backlight module for normal displaying of images.

Heretofore, image displaying made on a conventional liquid crystal display is generally conducted on the entirety of a screen. In other words, the entire light exit surface of the backlight module simultaneously emits light. For application of the liquid crystal displays in display devices, such as mobile phones and computers, it needs to light the entire screen to achieve desired displaying even if there is just one message to be read. Under this condition, the emission of light from the entire backlight module would increase the power consumption of the display device, leading to greatly shortening of the available service hours of the battery of the display device. Further, frequent charging/discharging would also cause shortening of the service life of the battery of the entire device and speeding up the aging rate of the display device.

SUMMARY OF THE INVENTION

The technical issue to be addressed by the present invention is to provide a backlight module, which allows for sectionized displaying and a liquid crystal display using the backlight module.

To achieve the above object, the present invention adopts the following technical solutions:

In an aspect, a backlight module is provided, comprising:

a light guide plate, which comprises a light incident surface, a light emission surface, and a first reflection surface, the light incident surface and the first reflection surface being respectively connected to two adjacent side edges of the light emission surface, the light incident surface comprising a first light incident section and a second light incident section, the first light incident section being located between the second light incident section and the first reflection surface, the first light incident section and the first reflection surface defining therebetween a first acute angle;

a light bar, which comprises a first light source and a second light source, the first light source being arranged to exactly correspond to the first light incident section so that light from the first light source is allowed to enter the light guide plate to be reflected by the first reflection surface for subsequent outward emission from the light emission surface, the second light source being arranged to exactly correspond to the second light incident section so that light from the second light source is allowed to enter the light guide plate for subsequent outward emission from the light emission surface; and a control circuit, which is electrically connected to the first light source and the second light source to control ON/OFF states of the first light source and the second light source.

In the above backlight module, the control circuit comprises a first solder pad and a second solder pad that are independent of each other. The first light source is electrically connected to the first solder pad. The second light source is electrically connected to the second solder pad.

In the above backlight module, the first light source has a projection surface that is substantially parallel to the first light incident section to increase a percentage of the light supplied from the first light source that enters the first light incident section.

In the above backlight module, the first light source is positioned against the first light incident section to allow the light from the first light source to directly enter the first light incident section.

In the above backlight module, the first light incident section comprises a plurality of light condensation structures for re-directing light toward the first reflection surface.

In the above backlight module, the first reflection surface is covered with a reflective film or reflective grid dots to increase utilization of light incident on the first reflection surface.

In the above backlight module, the first light source comprises a plurality of first sub light sources arranged in parallel to each other, the plurality of first sub light sources being spaced from the first light incident section by a same distance; and the second light source comprises a plurality of second sub light sources arranged in parallel to each other, the plurality of second sub light sources being spaced from the second light incident surface by a same distance.

In the above backlight module, the light guide plate comprises a second reflection surface. The second reflection surface and the first reflection surface are opposite to each other and are respectively connected to opposite sides of the light incident surface. The light incident surface further comprises a third light incident section. The third light incident section is located between the second light incident section and the second reflection surface. The third light incident section and the second reflection surface define therebetween a second acute angle. The light bar comprises a third light source. The third light source is arranged to exactly correspond to the third light incident section, such that light from the third light source is allowed to enter the light guide plate to be reflected by the second reflection surface for subsequent outward emission through the light emission surface. The control circuit is electrically connected to the third light source to control an ON/OFF state of the third light source.

In the above backlight module, the third light source is electrically connected to the first light source;

or alternatively, the control circuit comprises a third solder pad, the third solder pad being independent of the first solder pad and the second solder pad, the third light source being electrically connected to the third solder pad.

In another aspect, a liquid crystal display is provided, comprising the backlight module as described above.

In the above liquid crystal display, the liquid crystal display further comprises a liquid crystal display panel. The liquid crystal display panel comprises a first display zone and a second display zone. The first light source supplies backlighting to the first display zone. The second light source supplies backlighting to the second display zone.

Compared to the prior art, the present invention offers the following advantages:

In an embodiment of the present invention, the backlight module realizes sectionized displaying and thus, the backlight module is allowed to select different light emission mode according to actual needs. Since the backlight module may select a partial emission mode or a complete emission mode, the use of the backlight module is made more flexible and power consumption can be reduced. Further, since the first light incident section and the first reflection surface define therebetween the first acute angle and the first light source is arranged to exactly correspond to the first light incidence section, light supplied from the first light source and entering the light guide plate can be reflected, in the majority thereof, by the first reflection, whereby in conducting sectionized displaying with the backlight module, each section is provided with sufficient illumination.

BRIEF DESCRIPTION OF THE DRAWINGS

To more clearly explain the technical solution proposed in the present invention, a brief description of the drawings that are necessary for embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of an embodiment of the present invention with reference to the attached drawings of the embodiment of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
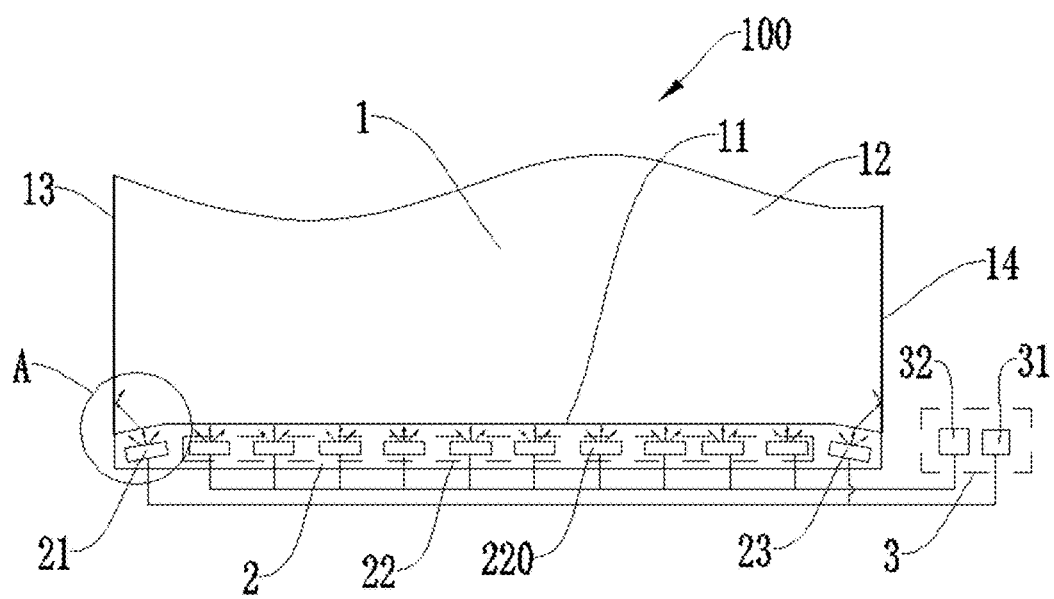
FIG. 1 is a schematic view illustrating a backlight module provided according to an embodiment of the present invention.
Figure 2:
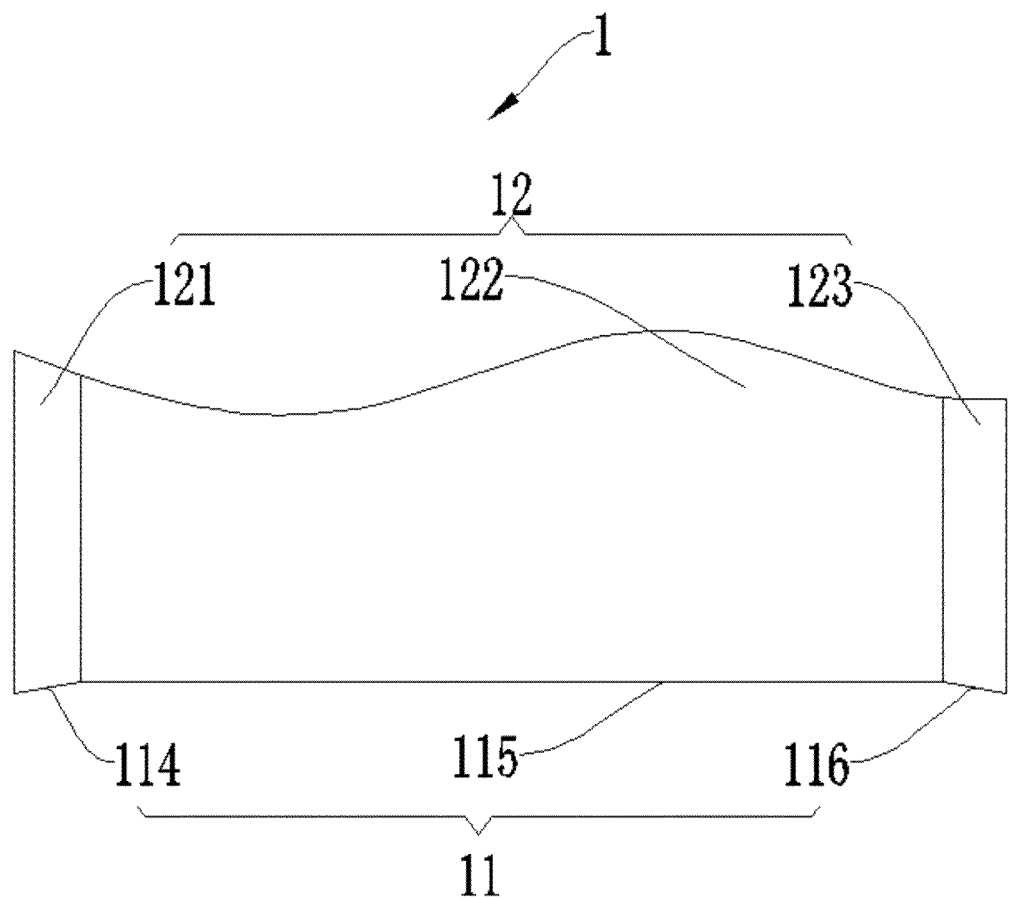
FIG. 2 is a schematic view illustrating a liquid guide plate of the backlight module provided according to the embodiment of the present invention.
Figure 3:
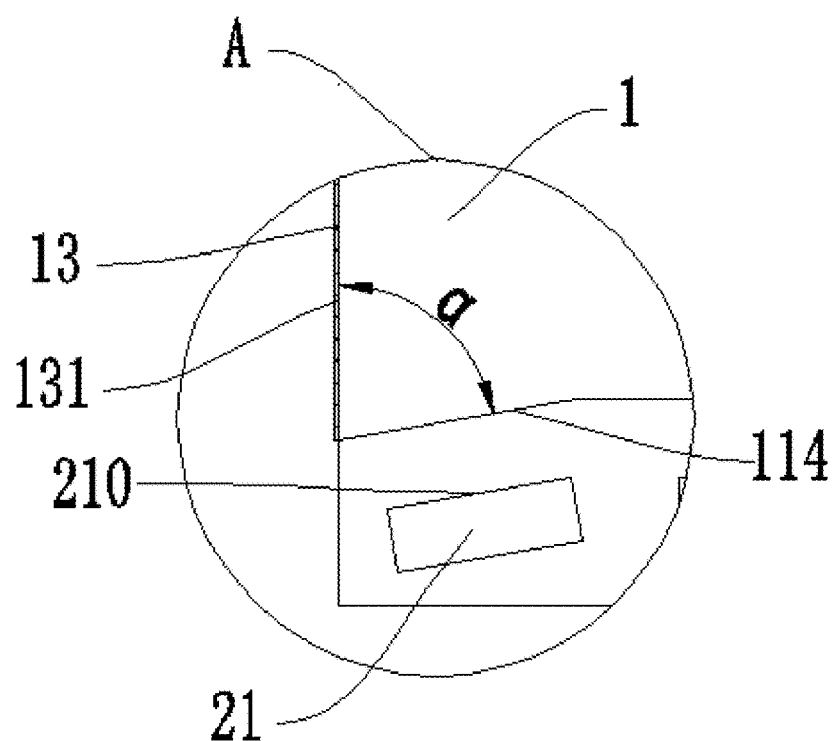
FIG. 3 is an enlarged view of circled portion A of FIG. 1.

Referring FIGS. 1-3, an embodiment of the present invention provides a backlight module 100, which comprises a light guide plate 1 and a light bar 2 and also a control circuit 3. The light guide plate 1 comprises a light incident surface 11, a light emission surface 12, and a first reflection surface 13. The light incident surface 11 and the first reflection surface 13 are respectively connected to two adjacent side edges of the light emission surface 12. The light incident surface 11 comprises a first light incident section 114 and a second light incident section 115. The first light incident section 114 is located between the second light incident section 115 and the first reflection surface 13 and the first light incident section 114 and the first reflection surface 13 define therebetween a first acute angle α. The light bar 2 comprises a first light source 21 and a second light source 22. The first light source 21 corresponds exactly to the first light incident section 114 so that light from the first light source 21 is allowed to enter the light guide plate 1 to be reflected by the first reflection surface 13 for subsequent outward emission from the light emission surface 12. The second light source 22 corresponds exactly to the second light incident section 115 so that light from the second light source 22 is allowed to enter the light guide plate 1 for subsequent outward emission from the light emission surface 12. The control circuit 3 is electrically connected to the first light source 21 and the second light source 22 to control individual states of the first light source 21 and the second light source 22. Under this condition, the control circuit 3 may control the first light source 21 and the second light source 22 to achieve various states, such as the first light source 21 and the second light source 22 being both energized (or de-energized) or one of the first light source 21 and the second light source 22 being energized (or de-energized).

In the instant embodiment, the backlight module 100 provides flexible control of states of brightening or darkening (namely being energized or de-energized) of the first light source 21 and the second light source 22 individually by means of the control circuit 3. Further, the light from the first light source 21 enters the light guide plate 1 through the first light incident section 114 and is reflected by the first reflection surface 13 for subsequent outward emission from the light emission surface 12 (wherein the area in which the outward emission is conducted is defined as a first light emission section 121); and the light from the second light source 22 enters the light guide plate 1 through the second light incident section 115 for subsequent outward emission from the light emission surface 12 (wherein the area in which the outward emission is conducted in defined as a second light emission section 122), whereby the light emission surface 12 of the light guide plate 1 may achieve sectionized light emission and the light guide plate 1 allows for optional light emission from the first light emission section 121 and/or the second light emission section 122. Since the light guide plate 1 allows for sectionized light emission, the backlight module 100 may adopt different light emission modes according to actual needs, such that the backlight module 100 may select a localized partial light emission mode or a global complete light emission mode, whereby the application of the backlight module 100 is made more flexible and allows for reduction of energy consumption and thus extension of the life span of the backlight module 100.

Further, since the first light incident section 114 and the first reflection surface 13 define therebetween the first acute angle α and the first light source 21 is arranged to exactly correspond to the first light incident section 114, the first reflection surface 13 may reflect a majority of the light of the first light source that enters the light guide plate 1 or the first reflection surface 13 may even reflect the light from the first light source 21 with the entire surface thereof such that the first light emission section 121 is provided with sufficient illumination to prevent any potential issue that a peripheral area of the light emission surface of the light guide plate the light emission surface shows insufficient illumination. Thus, when the backlight module 100 undergoes sectionized displaying, each mode of light emission provides sufficient illumination.

It can be appreciated that in the instant embodiment, the regional relationship between the first light emission section 121 and the second light emission section 122 is defined in an idealized manner in FIG. 2. However, in various applications, due to the property of light for spreading out, there is often a partly overlapping area between the first light emission section 121 and the second light emission section 122 and the size of the overlapping area is relevant to various factors including light emission angles and positional relationship of the first light source 21 and the second light source 22 and the structure of reflection surfaces inside the light guide plate 1 (including not just the first reflection surface 13 and also including other reflection surfaces inside the light guide plate 1), allowing for flexible adjustment. In the embodiment of the present invention, the overlapping area is reduced as much as possible in order to reduce energy consumption as much as possible when sectionized displaying is conducted with the backlight module 100 and to increase brightness and homogeneity of the emission light from the backlight module 100. Certainly, in the instant embodiment, with reference to both FIGS. 1 and 2, since the light from the second light source 22 enters through the second light incident section 115 and exits from the second light emission section 122 and since the second light emission section 122 is arranged in the middle of the light emission surface 12, the second light emission section 122 often exhibits lighting that is brighter and more uniformly.

Further, referring to FIG. 1, as an optional embodiment of the present invention, the control circuit comprises a first solder pad 31 and a second solder pad 32 that are independent of each other. The first light source 21 is electrically connected to the first solder pad 31, and the second light source 22 is electrically connected to the second solder pad 32. Since the first solder pad 31 and the second solder pad 32 are independent of each other, various modes of electrical connection can be achieved for realizing separate or simultaneous energization so that the backlight module may control individual states of the first light source 21 and the second light source 22.

Further, referring to FIGS. 1-3, as a preferred embodiment of the present invention, the first light source 21 can be any type of light source having a light projection surface 210, such as a planar light source or a light-emitting diode having a casing that defines the projection surface 210. To increase the percentage of light that is supplied from the first light source 21 entering the first light incident section 114, the projection surface 210 is arranged to substantially parallel to the first light incident section 114, in order to improve the capability of the first light incident section 114 to receive light emitting from the first light source 21 and thus enhance the brightness of the first light emission section 121. Further, the projection surface 210 can be arranged to be directly positioned against the first light incident section 114 such that light from the first light source 21 may directly enters the first light incident section 114. Further, as an optional embodiment, the first acute angle α satisfies: 20°≤α≤60°.

Further, as another optional embodiment, the first acute angle α can be smaller than or equal to θ/2, where θ is a light emission angle θ of the first light source 21. Preferably, the light emission angle θ satisfies: 45≤α≤180°.

Further, the first light incident section 114 may comprise a light condensation structure to make light projecting toward the first reflection surface 16, namely causing light moving away from the first reflection surface 13 to be turned toward the first reflection surface 13 in order to further improve the brightness of the first light emission section 121. Optionally, the light condensation structure can be constructed as a rhombus structure, a semicircular structure, or a trapezoidal structure.

Referring collectively to FIGS. 1 and 3, as an optional embodiment, the first reflection surface 13 of the light guide plate 1 may be covered with a reflective film 131 in order to increase utilization of light incident onto the first reflection surface 13. Of course, in other embodiments, covering may be made with a reflector board.

Figure 4:
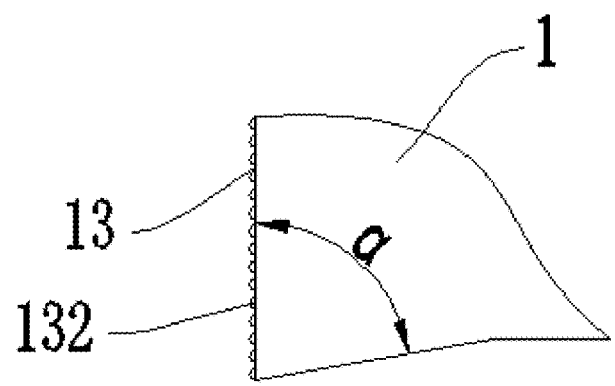
FIG. 4 is a schematic view illustrating a portion of the light guide plate of the backlight provided according to the embodiment of the present invention.

Referring to FIGS. 1 and 4, as another optional embodiment, the first reflection surface 13 of the light guide plate 1 may be provided with and covered with reflective grid dots 132 in order to increase utilization of light incident onto the first reflection surface 13.

Referring to FIG. 1, optionally, the second light source 22 comprises a plurality of second sub light sources 220 that is arranged in parallel to each other and the plurality of second sub light sources 220 is spaced from the second light incident section 115 by the same distance. The plurality of second sub light sources 220 is arranged such that they are spaced from each other.

Further, as an optional embodiment, referring to FIGS. 1 and 2, the first light source 21 comprises a plurality of first sub light sources (not shown) that is arranged in parallel to each other. The plurality of first sub light sources is spaced from the first light incident section 114 by the same distance. When the plurality of first sub light sources each has a light projection surface, the projection surfaces of plurality of first sub light sources are substantially coplanar with each other and parallel to the first light incident section 114, or even attached to or positioned against the first light incident section 114. Under this condition, light from the first light source 21 is completely guided to directly enter the light guide plate 1 to provide the first light emission section 121 with an enlarged area and more intense light.

Further, referring to FIGS. 1 and 2, optionally, the light guide plate 1 of the backlight module 100 may further comprise a second reflection surface 14. The second reflection surface 14 and the first reflection surface 13 are arranged opposite to each other and respectively connected to opposite sides of the light incident surface 11 (and also respectively connected to opposite sides of the light emission surface 12). The light incident surface 11 further comprises a third light incident section 116, and the third light incident section 116 is arranged between the second light incident section 115 and the second reflection surface 14. The third light incident section 116 and the second reflection surface 14 define therebetween a second acute angle. The light bar 2 further comprises a third light source 23. The third light source 23 is arranged to correspond exactly to the third light incident section 116 such light from the third light source 23 enters the light guide plate 1 and is reflected by the second reflection surface 14 to subsequently exit and emit from the light emission surface 12. The control circuit 3 is electrically connected to the third light source 23 to control the state of the third light source 23.

In the instant embodiment, light from the third light source 23 of the backlight module 100 enters the light guide plate 1 through the third light incident section 116 and is reflected by the second reflection surface 14 for subsequent outward emission from the light emission surface 12, wherein the area in which the outward emission is conducted is defined as a third light emission section 123. In other words, the backlight module 100 is provided with three light emission sections (the first light emission section 121, the second light emission section 122, and the third light emission section 123). Since the control circuit 23 is electrically connected to the first light source 21, the second light source 22 and the third light source 23 to individually control the state of each of the three, the backlight module 100 may exhibit more diversified modes of displaying and also meet the needs for multiple functions and low power consumption.

Further, electrical connection of the third light source 23 with other components may be achieved with various ways. For example, the third light source 23 may be electrically connected to the first light source 21 such that the third light emission section 123 and the first light emission section 121 are operated with the same state of brightness/darkness; or alternatively, the control circuit 3 comprises a third solder pad (not shown) and the third solder pad is separate from and independent of the first solder pad 31 and the second solder pad 32. The third light source 23 is electrically connected to the third solder pad, such that the state of brightness/darkness of the third light source 23 can be made different from those of the first light source 21 and the second light source 22 and thus the state of the third light emission section 123 is independent of those of the first light emission section 121 and the second light emission section 122. Under this condition, the first light emission section 121, the second light emission section 122, and the third light emission section 123 of the light guide plate 1 can be operated for independent displaying or combined displaying and thus, the backlight module 100 may exhibit more diversified modes of displaying. Certainly, the third light source 23 may be arranged to provide different ways of electrical connection of which the details will be omitted herein.

As an optional embodiment, the second acute angle may be equal to the first acute angle.

Figure 5:
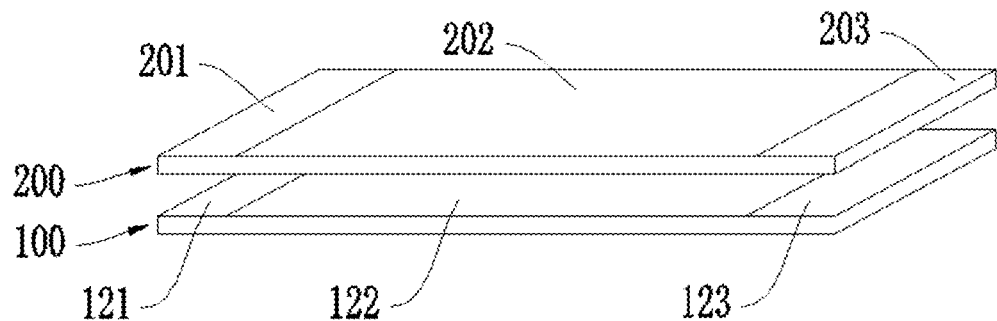
FIG. 5 is a schematic view illustrating a liquid crystal display provided according to an embodiment of the present invention.

Referring to FIGS. 1 and 5, a further embodiment of the present invention provides a liquid crystal display, which comprises the backlight module 100 that was described above and a liquid crystal display panel 200. The liquid crystal display panel 200 comprises a first display zone 201 and a second display zone 202. The first light source 21 supplies backlighting to the first display zone 201 and the second light source 22 supplies backlighting to the second display zone 202.

In the instant embodiment, the first light source 21 and the second light source 22 are mutually independent of each other and thus, the first display zone 201 and the second display zone 202 may realize sectionized displaying, such that the liquid crystal display may selectively use the first display zone 201 and/or the second display zone 202 to display. Since the liquid crystal display is enabled for displaying with different modes according to specific needs, the liquid crystal display is allowed to select a mode of displaying in a part thereof or a mode of displaying in the entirety thereof such that utilization of the liquid crystal display is flexible and power consumption can be reduced. The property of the liquid crystal display for reduced power consumption makes the available service hours and the life span of a power supply device thereof extended.

Specifically, the first light emission section 121 of the light guide plate 1 of the backlight module 100 is arranged to exactly correspond to the first display zone 201 so that light supplied from the first light source 21, after being projected out of the first light emission section 121, enters the first display zone 201, serving as backlighting to the first display zone 201; the second light emission section 122 of the light guide plate 1 is arranged to exactly correspond to the second display zone 202, so that light supplied from the second light source 22, after being projected out of the second light emission section 122, entering the second display zone 202, serving as backlighting to the second display zone 202.

Figure 6:
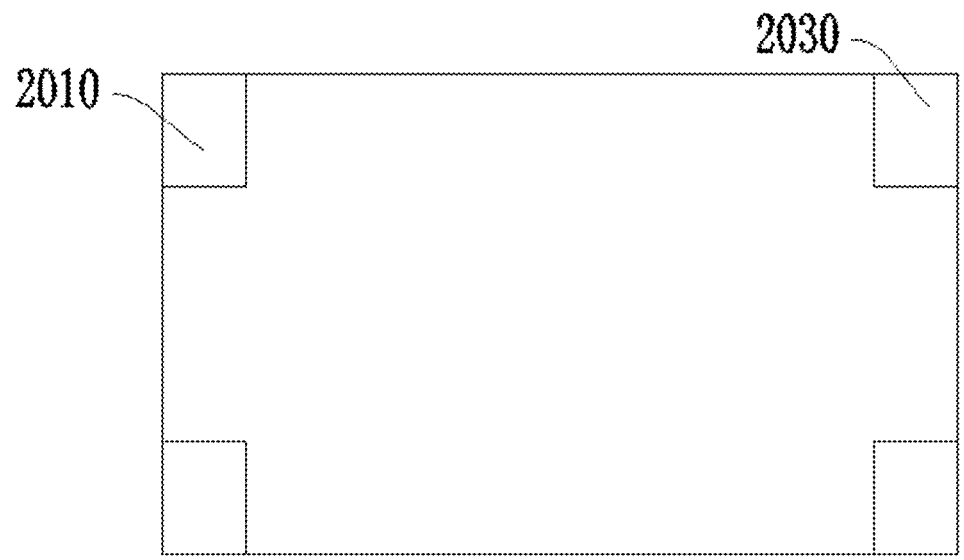
FIG. 6 is a schematic view illustrating display zones of a liquid crystal display panel of the liquid crystal display provided according to the embodiment of the present invention.

Further, referring collectively to FIGS. 5 and 6, through controlling rotation of liquid crystal contained in the liquid crystal display panel 200, the first display zone 201 and the second display zone 202 may conduct entire-surface-area displaying or partial-surface-area displaying (where another part of the surface area is not in displaying), whereby the first display zone 201 may be further divided into a plurality of first sub display zones 2010 that is mutually separated from each other. For example, the number of the first sub display zones 2010 involved may be two and the two first sub display zones 2010 are respectively located at two opposite ends of the first display zone 201. Through an algorithm of an integrated circuit (IC) controlling the rotating of the liquid crystal contained in the liquid crystal display panel 200, the first sub display zones 2010 may conduct selective displaying. The first sub display zones 2010 can be used to display for example time, emails, weather information, and messages. These types of information needs only a small displaying area to conduct displaying of the entire information and thus, the sectionized displaying achieved with the liquid crystal display of the embodiment of the present invention allows for reduction of power consumption of the liquid crystal display, while ensuring effective displaying of messages so that the available service hours and the life span of a power supply device of the liquid crystal display can be extended.

It is appreciated that in the embodiment of the present invention, the first sub display zones 2010 may be shaped as rectangles, triangles, and semicircles. To provide the first sub display zones 2010 with more intense light, the liquid crystal display panel 200 may adopt a design involving individual ones of RGBW (R for red, G for green, B for blue, and W for white) pixel arrangement, Rain pixel arrangement, and RGB pixel unit, or a combination thereof.

Referring collectively to FIGS. 5 and 6, in other embodiments, the liquid crystal display panel 200 of the liquid crystal display further comprises a third display zone 203, and the third display zone 203 comprises a plurality of third sub display zones 2030 that is mutually separated from each other. The operation of the liquid crystal display of the instant embodiment is similar to that of the liquid crystal display described above and repeated description will be omitted here.

The above provides a detailed description of an embodiment of the present invention. In the disclosure, reference is made to an example for describing principle and embodiment of the present invention. The illustration of the above embodiment is provided to help understanding of the method and the essential idea of the present invention. Further, based on the idea of the present invention, those having ordinary skills in the field of the art may readily appreciate modifications that can be made in respect of the way of embodiment and the range of application. In brief, the contents disclosed in this specification is not intended to impose undue limitations to the scope of the present invention.

What is claimed is:

1. A backlight module, comprising:
   a light guide plate, which comprises a light incident surface, a light emission surface, and a first reflection surface, the light incident surface and the first reflection surface being respectively connected to two adjacent side edges of the light emission surface, the light incident surface comprising a first light incident section having a first planar surface and a second light incident section having a second planar surface, the first light incident section being located between the second light incident section and the first reflection surface, the first planar surface of the first light incident section and the first reflection surface defining therebetween a first acute angle, the first planar surface and second planar surface defining therebetween an angle determined by the first acute angle;
   a light bar, which comprises a first light source and a second light source, the first light source being arranged to exactly correspond to and opposite to the first planar surface of the first light incident section so that light from the first light source is allowed to enter the light guide plate through the first planar surface to be reflected by the first reflection surface for subsequent outward emission from the light emission surface, the second light source being arranged to exactly correspond to and opposite to the second planar surface of the second light incident section so that light from the second light source is allowed to enter the light guide plate for subsequent outward emission from the light emission surface; and
   a control circuit, which is electrically connected to the first light source and the second light source to control ON/OFF states of the first light source and the second light source;
   wherein the first light source comprises a plurality of first sub light sources arranged in a first line that is parallel to the first planar surface and the plurality of first sub light sources are spaced from the first planar surface of the first light incident section by a same distance; and
   the second light source comprises a plurality of second sub light sources arranged in a line that is parallel to the second planar surface and the plurality of second sub light sources are spaced from the second planar surface of the second light incident surface by a same distance, such that the first line along which the plurality of first sub light sources are arranged and the second line along which the plurality of second sub light sources are arranged define therebetween an angle corresponding to the angle defined by the first planar surface and the second planar surface.

2. The backlight module as claimed in claim 1, wherein the control circuit comprises a first solder pad and a second solder pad that are independent of each other, the first light source being electrically connected to the first solder pad, the second light source being electrically connected to the second solder pad.

3. The backlight module as claimed in claim 1, wherein the first light source has a projection surface that is substantially parallel to the first light incident section to increase a percentage of the light supplied from the first light source that enters the first light incident section.

4. The backlight module as claimed in claim 1, wherein the first light source is positioned against the first light incident section to allow the light from the first light source to directly enter the first light incident section.

5. The backlight module as claimed in claim 1, wherein the first light incident section comprises a plurality of light condensation structures for re-directing light toward the first reflection surface.

6. The backlight module as claimed in claim 1, wherein the first reflection surface is covered with a reflective film or reflective grid dots to increase utilization of light incident on the first reflection surface.

7. The backlight module as claimed in claim 1, wherein the light guide plate comprises a second reflection surface, the second reflection surface and the first reflection surface being opposite to each other and respectively connected to opposite sides of the light incident surface, the light incident surface further comprising a third light incident section, the third light incident section being located between the second light incident section and the second reflection surface, the third light incident section and the second reflection surface defining therebetween a second acute angle, the light bar comprising a third light source, the third light source being arranged to exactly correspond to the third light incident section, such that light from the third light source is allowed to enter the light guide plate to be reflected by the second reflection surface for subsequent outward emission through the light emission surface, the control circuit being electrically connected to the third light source to control an ON/OFF state of the third light source.

8. The backlight module as claimed in claim 7, wherein the third light source is electrically connected to the first light source;
   or alternatively, the control circuit comprises a third solder pad, the third solder pad being independent of the first solder pad and the second solder pad, the third light source being electrically connected to the third solder pad.

9. A liquid crystal display, comprising the backlight module as claimed in claim 1.

* * * * *